United States Patent
Bolyasnikova et al.

(10) Patent No.: US 8,025,817 B2
(45) Date of Patent: Sep. 27, 2011

(54) FLUORESCENT CERAMIC AND FABRICATION METHOD THEREOF

(75) Inventors: Ludmila Bolyasnikova, St. Petersburg (RU); Vladimir Demidenko, St. Petersburg (RU); Elena Gorokhova, St. Petersburg (RU); Olga Ovsyannikova, St. Petersburg (RU); Olga Khristich, St. Petersburg (RU); Herfried Wieczorek, Aachen (DE); Cornelis Reinder Ronda, Aachen (DE); Gunter Zeitler, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 972 days.

(21) Appl. No.: 11/569,068

(22) PCT Filed: May 12, 2005

(86) PCT No.: PCT/IB2005/051562
§ 371 (c)(1),
(2), (4) Date: Nov. 26, 2007

(87) PCT Pub. No.: WO2005/110943
PCT Pub. Date: Nov. 24, 2005

(65) Prior Publication Data
US 2008/0210885 A1 Sep. 4, 2008

(30) Foreign Application Priority Data

May 17, 2004 (RU) .................... 2004114975

(51) Int. Cl.
*C04B 35/547* (2006.01)
*C04B 35/50* (2006.01)
*C04B 35/053* (2006.01)
*C09K 11/77* (2006.01)

(52) U.S. Cl. ................. 252/301.4 S; 501/152; 264/21; 264/125

(58) Field of Classification Search ............ 252/301.4 S; 501/152; 264/21, 125
See application file for complete search history.

(56) References Cited

U.S. PATENT DOCUMENTS

| 4,752,424 A | * | 6/1988 | Matsuda et al. | ............. 264/1.22 |
| 5,296,163 A | * | 3/1994 | Leppert et al. | .......... 252/301.4 S |
| 5,518,659 A | | 5/1996 | Rossner et al. | |
| 6,504,156 B1 | * | 1/2003 | Takahara et al. | ......... 250/361 R |
| 2004/0100000 A1 | | 5/2004 | Kobusch et al. | |

FOREIGN PATENT DOCUMENTS

| EP | 0 690 116 A1 | 1/1996 |
| EP | 1 493 798 A1 | 1/2005 |

OTHER PUBLICATIONS

Translation for EP 690116.*
Moewes, A., et al.; Soft X-ray simulated luminescence microscopy and spectroscopy on Gd2O2S:Pr3+ and (Y,Gd) 2O3:Eu3+ ceramics; 1996; Nuclear Instruments and Methods in Physics Research; A 373; pp. 299-304.

* cited by examiner

*Primary Examiner* — C. Melissa Koslow

(57) ABSTRACT

The present invention relates to a fluorescent ceramic having the general formula $Gd_2O_2S$ doped with M, whereby M represents at least one element selected form the group Ce, Pr, Eu, Tb, Yb, Dy, Sm and/or Ho, whereby said fluorescent ceramic comprises a single phase in its volume; to a method for manufacturing a fluorescent ceramic using single-axis hot pressing; a detector for detecting ionizing radiation and to a use of said detector for detecting ionizing radiation. The method for manufacture of a fluorescent ceramic material using a single-axis hot pressing, comprises the steps: a) selecting a pigment powder of $Gd_2O_2S$ doped with M, and M represents at least one element selected from the group of Eu, Tb, Yb, Dy, Sm, Ho, Ce and/or Pr, whereby the grain size of said powder used for hot-pressing is of 1 μm, and said hot-pressing is carried out at—a temperature of 1000° C. to 1400° C.; and/or—a pressure of 100 Mpa to 300 MPa; air annealing at a temperature of 700° C. to 1200° for a time period of 0.5 hours to 30 hours.

8 Claims, No Drawings

FLUORESCENT CERAMIC AND FABRICATION METHOD THEREOF

The present invention is directed to a fluorescent ceramic having the general formula $Gd_2O_2S$ doped with M, whereby M represents at least one element selected from the group Ce, Pr, Eu, Tb, Yb, Dy, Sm and/or Ho.

The invention further relates to a method for manufacturing a fluorescent ceramic using single-axis hot pressing.

The invention still further relates to a detector for detecting ionizing radiation.

The invention still further relates to a use of said detector for detecting ionizing radiation.

Fluorescent members for detecting high-energy radiation contain a phosphor that can absorb the radiation and convert it into visible light. The luminescent emission thereby generated is electronically acquired and evaluated with the assistance of light sensitive systems such as photodiodes or photomultipliers. Such fluorescent members can be manufactured of single-crystal materials, for example, doped alkali halides. Non-single-crystal materials can be employed as powdered phosphor or in the form of ceramic members manufactured therefrom.

It is a drawback of the known method (see e.g. U.S. Pat. No. 5,518,659) that said powders with grain sizes from 10 nm to 100 nm are chemically unstable when stored in air leading to surface oxidation of the powder. The surface oxidation inevitably leads to a second undesirable phase in a volume of the resulting ceramics. The second phase disadvantageously contributes to scattering within the volume of the ceramics thus decreasing the light output. It must be noted that the surface oxidation occurs even during a short period of handling raw material in air, e.g. weighing it and loading the press-mold. In order to reduce oxysulfate to oxysulfide it is suggested in U.S. Pat. No. 5,518,659 to use a reducing atmosphere in the course of hot pressing, with gas pressure in the furnace space up to 0.1 MPa, approximately atmospheric pressure. However, due to the presence of the atmospheric gas counter-pressure in pores of the polycrystalline brick, compacting is limited. Thus the pores cannot be closed completely so that optimal microstructure cannot be formed.

The object of the present invention is to provide a method for manufacturing a scintillating ceramics with a still further improved light output and afterglow characteristics.

The above-described objective can be achieved according to the present invention by a method for manufacture of a fluorescent ceramic material using a single-axis hot pressing, whereby said inventive method comprises the steps:

a) selecting a pigment powder of $Gd_2O_2S$ doped with M, and M represents at least one element selected from the group of Eu, Tb, Yb, Dy, Sm, Ho, Ce and/or Pr, whereby the grain size of said powder used for hot-pressing is of 1 μm to 20 μm, and said hot-pressing is carried out at a temperature of 1000° C. to 1400° C.; and a pressure of 100 MPa to 300 MPa;

b) air annealing at a temperature of 700° C. to 1200° C. for a time period of 0.5 hours to 30 hours.

The pigment powder of $Gd_2O_2S$ can comprise an amount of M from 0.1 ppm to 1000 ppm (weight fraction).

It is found out that relatively coarse-grained powders, which are chemically stable in air, can be successfully pressed to form a fluorescent crystal with improved characteristics.

Thus, according to the present invention it can be preferred that the pressing mode is at a temperature of 1000° C. to 1400° C., preferably of 1100° C. to 1300° C., more preferably of 1150° C. to 1250° C.; and/or a pressure of 100 MPa to 300 MPa, preferably of 180 MPa to 280 MPa and more preferably of 200 MPa to 250 MPa.

According to the present invention the vacuum can be adjusted in the range of $\geq 0.01$ Pa and $\leq 50$ Pa, preferred in the range of $\geq 0.01$ Pa and $\leq 10$ Pa and most preferred the vacuum is adjusted to the range of $\geq 0.01$ Pa and $<1$ Pa.

The fluorescent ceramic, after the step of single-axis hot-pressing under vacuum, can be further treated by air annealing at a temperature of 700° C. to 1200° C., preferably of 800° C. to 1100° C., more preferably of 900° C. to 1000° C.; whereby said time period for air annealing treatment is 0.5 hours to 30 hours, preferably 1 hours to 20 hours, more preferably 2 hours to 10 hours and most preferably 2 hours to 4 hours.

Another advantage of the present invention is that $Gd_2O_2S$ material with an average grain size in the range of 1 μm to 20 μm can be commonly purchased by manufactures of the fluorescent ceramics as a raw material and do not need to be broken up to finer particles of less than 100 nm. In an embodiment it is preferred that $Gd_2O_2S$ pigment powder used according to the present invention has an average grain size in the range of 2 μm to 10 μm and more preferably of 4 μm to 6 μm. Moreover, due to the method of the invention no specific powder production process is necessary, as conventionally available powders may be successfully used for manufacturing of luminescent ceramics.

Following ceramics parameters have been achieved with the method according to the invention:

an afterglow in the range of $1 \times 10^{-6}$ to $8 \times 10^{-5}$ at 500 ms; and/or a total transparency in the range of 0 to 50%, preferably 10% to 50%, still preferably 20-50% measured for a wavelength of 513 nm.

The ceramics of the present invention can be advantageously used for manufacturing x-ray luminescent ceramics that serve as raw material in fabrication of medical computer tomographs (CT).

It is found to be advantageous to introduce the vacuum annealing step for still further improving optical properties of resulting ceramics. During this step a further grain growth in the ceramics takes place which further improves transparency due to a decrease in porosity. Next to this, due to the grain growth an additional diffusion of a dopant atoms in the lattice of oxysulfide enables still further improving scintillating properties of the ceramics.

Therefore, according to one embodiment of the method according to the present invention between step a) and step b) an additional step c) can be carried out, whereby step c) comprises annealing fluorescent ceramic under vacuum at a temperature of 1000° C. to 1400° C. for a period of time of 0.5 hours to 30 hours.

Preferably, the annealing temperature is selected in the range of 1100° C. to 1300° C., more preferably of 1200° C. to 1250° C.

The time period for vacuum annealing can be preferably set to 1 hours to 20 hours, more preferably to 2 hours to 10 hours and most preferably 3 hours to 5 hours.

In a still further embodiment of the method according to the present invention for step a) an undoped $Gd_2O_2S$ powder with a grain size between 1 μm and 20 μm is mixed with a composition comprising at least one element of the group of rare earth ions comprising Pr, Ce, Eu, Tb, Yb, Dy, Sm and/or Ho.

This technical measure still further simplifies a process of ceramics manufacturing as a broad range of available materials can be used. For example, in case Pr or Ce are selected as envisaged dopants, an introduction of Pr or Ce ions can be carried out using aqueous solutions of corresponding salts: $PrCl_3$, $PrBr_3$, $PrI_3$, $Pr(NO_3)3$, $Pr_2(SO_4)_3$, $CeCl_3$, $CeBr_3$, $CeI_3$, $Ce(NO_3)_3$, $Ce_2(SO_4)_3$, etc. Alternatively, the introduction of dopant ions can be carried out during a mechanical mixture of powders of $Gd_2O_2S$ with insoluble compositions comprising the dopant, like oxides, for example $Pr_6O_{11}$, $Pr_2O_3$, $Ce_2O_3$, $CeO_2$.

Still alternatively $Gd_2O_2S$ powder may be mechanically mixed with water insoluble salts of the dopant, like $PrF_3$, $Pr_2S_3$, $Pr_2O_2S$, $Pr_2(CO_3)_3$, $Pr_2(C_2O_4)_3$, $CeF_3$, $Ce_2O_2S$, $Ce_2(CO_3)_3$, $Ce_2(C_2O_4)_3$, an there like.

This principle of a dopant introduction may be used for introduction of ions such as Th, Eu and other rare earth elements. Additionally, ions of other elements not being rare earth ions may be introduced accordingly. Preferably, a suitable sintering aid is co-mixed prior to hot-pressing. Various sintering aids are per se known in the art.

The invention further relates to ceramics being represented by a chemical formula of $Gd_2O_2S$ doped with M, whereby M represents at least one element selected from the group Pr, Ce, Eu, Tb, Yb, Dy, Sm and/or Ho, whereby said fluorescent ceramic comprises a single phase in its volume.

Due to the technical measure of the invention, namely an absence of foreign phases in the volume of resulting ceramics, its transparency value is increased.

Further it has been found that the fluorescent ceramic of the present invention can have a significantly increased relative light yield or light output relative to ceramic fluorescent material that is available on the market. The difference is especially seen for a ceramic thickness of equal or more than 1.5 mm. The light output can be a factor of 2.3 higher than that of cadmium tungstate crystals of the same thickness.

The doped pigment powder of $Gd_2O_2S$ can have a surface according to BET in the range of $\geq 0.01$ m$^2$/g and $\leq 1$ m$^2$/g, preferably of $\geq 0.05$ m$^2$/g and $\leq 0.5$ m$^2$/g and more preferably of $\geq 0.1$ m$^2$/g and $\leq 0.2$ m$^2$/g.

The $Gd_2O_2S$ can be doped by at least one element selected from the group of Ce Pr Eu, Tb, Yb, Dy, Sm and/or Ho. It is preferred that the $Gd_2O_2S$ powder is doped by one element selected from the group of Ce, Pr, Eu, Tb, Yb, Dy, Sm and Ho only. Most preferred is the use of an element of Ce or Pr.

The content of Ce in the $Gd_2O_2S$ powder in a weight fraction can be from 0.1 ppm to 100 ppm, preferably 5 ppm to 50 ppm and more preferably 10 ppm to 25 ppm and/or the content of Pr in the $Gd_2O_2S$ powder can be from 100 ppm to 1000 ppm, preferably 300 ppm to 800 ppm and more preferably 500 ppm to 800 ppm.

It has been found that the $Gd_2O_2S$ fluorescent ceramics of the present invention can have a significantly reduced afterglow in the range of $1 \times 10^{-6}$ to $8 \times 10^{-5}$ at 500 ms. The fluorescent ceramic of the present invention can preferably have an afterglow in the range of $1.0 \times 10^{-6}$ to $6 \times 10^{-5}$ at 500 ms, preferably of $1.0 \times 10^{-6}$ to $5 \times 10^{-5}$ at 500 ms and more preferred of $1.0 \times 10^{-6}$ to $3.0 \times 10^{-5}$ at 500 ms.

Fluorescent ceramics according to the present invention are preferably subjected to an uni-axial hot pressing during the manufacture. At the step of uni-axial hot pressing the polycrystalline brick is compacted preferably down to density values close to theoretical density of $p_{rel} > 99.7\%$ $p_{theor}$. Due to the high densities, the fluorescent ceramics of the present invention can provide a good transparency in the optical range. It is therefore preferred that the fluorescent ceramic of the present invention has a density of $\geq 99.0\%$, preferably of $\geq 99.5\%$ and more preferred $\geq 99.7\%$ and $\leq 100\%$.

Further it has been surprisingly found that the fluorescent ceramic of the present invention can have a significantly increased relative light yield or light output in the range of 0.74 to 1.00, preferably of 0.80 to 1.00 and more preferably of 0.84 to 1.00.

The size of the crystallites of the fluorescent ceramic according to the present invention is preferably higher compared with the grain size of the starting powder of the M doped $Gd_2O_2S$ grains. It is preferred that $\geq 50\%$, preferably $\geq 70\%$ and more preferred $\geq 90\%$ of the M doped $Gd_2O_2S$ crystallites of the fluorescent ceramic should have a crystallite size of 1 to 300 μm, preferably of 10 to 100 μm.

The fluorescent ceramic material can have a texture in at least one crystallographic plane. The fluorescent ceramic according to the present invention can have a texture in the plane 001, which corresponds to a plane in a lattice oriented substantially perpendicular to a direction of a pressure applied during a process of uni-axial pressing.

Thus, in general there are two alternatives to manufacture fluorescent ceramic material according to the present invention. The alternative I involves steps a) and b) whereas the alternative II comprises steps a), b) and c), whereby step c) is carried out between step a) and step b).

The invention will further be illustrated by a specific embodiment of example 1 to 12 of the invention.

EXAMPLES 1 TO 12

The initial raw material of examples 1 to 12 of table I with a grain size as given in table I are subjected to uniaxial hot pressure under vacuum of about 0.1-1 Pa. The pressing temperature is given in table I and the pressure is 200 MPa for examples 1 to 5, 7 to 10 and 12 and 250 MPa for examples 6 and 11 followed by air annealing, except for comparative example 1.

The data for examples 1 to 12, relative light yield and afterglow in $10^{-6}$ at 500 ms is given in table I below.

TABLE I

| Expl. | Composition of the initial raw material | Graine size of the raw material, μm | Pressing temperature, 0 C. | Pressing pressure, MPa at vacuum of about 0.1-1 Pa | Air annealing | Light yield (rel.) | Afterglow, $10^{-6}$ at 500 ms |
|---|---|---|---|---|---|---|---|
| 1 | $Gd_2O_2S$: 730 ppm Pr: 10 ppm Ce | 6-7 | 1250 | 200 | — | 0.27 | 650 |
| 2 | $Gd_2O_2S$: 730 ppm Pr: 10 ppm Ce | 6-7 | 1250 | 200 | 1000° C.-2 h | 0.87 | 55 |
| 3 | $Gd_2O_2S$: 650 ppm Pr: 10 ppm Ce | 6-9 | 1250 | 200 | 1000° C.-4 h. | 0.88 | 50 |
| 4 | $Gd_2O_2S$: 610 ppm Pr: 23 ppm Ce | 6-9 | 1250 | 200 | 1000° C.-4 h | 0.84 | 54 |

TABLE I-continued

| Expl. | Composition of the initial raw material | Graine size of the raw material, μm | Pressing temperature, 0 C. | Pressing pressure, MPa at vacuum of about 0.1-1 Pa | Air annealing | Light yield (rel.) | Afterglow, $10^{-6}$ at 500 ms |
|---|---|---|---|---|---|---|---|
| 5 | $Gd_2O_2S$: 650 ppm Pr: 23 ppm Ce | 6-9 | 1240 | 200 | 1000° C.-2 h, 1100° C.-4 h | 0.92 | 54 |
| 6 | $Gd_2O_2S$: 650 ppm Pr: 23 ppm Ce | 6-9 | 1240 | 250 | 1000° C.-4 h. | 0.90 | 25 |
| 7 | $Gd_2O_2S$: 750 ppm Pr: 20 ppm Ce | 2-5 | 1220 | 200 | 1000° C.-4 h | 1.0 | 28 |
| 8 | $Gd_2O_2S$: 750 ppm Pr: 20 ppm Ce | 2-5 | 1220 | 200 | 1000° C.-4 h | 0.99 | 14 |
| 9 | $Gd_2O_2S$: 750 ppm Pr: 20 ppm Ce | 2-5 | 1220 | 200 | 1000° C.-4 h, 800° C.-4 h | 0.93 | 23 |
| 10 | $Gd_2O_2S$: 750 ppm Pr: 20 ppm Ce | 2-5 | 1220 | 200 | 900° C.-14 h | 0.79 | 16 |
| 11 | $Gd_2O_2S$: 650 ppm Pr: 20 ppm Ce | 6-9 | 1200 | 250 | 1000° C.-4 h | 0.92 | 14 |
| 12 | $Gd_2O_2S$: 650 ppm Pr: 20 ppm Ce | 6-9 | 1220 | 200 | 1000° C.-4 h 800-10 h | 0.92 | 8 |

EXAMPLES 13 TO 21

The initial raw material according to examples 13 to 21 of table II with a grain size of 6 μm to 9 μm are subjected to uniaxial hot pressure under vacuum at about 0.1-1 Pa. The pressing temperature is given in table II and the pressure is 250 MPa for examples 13 and 14 and 200 MPa for examples 15 to 21. Examples 13, 15, 18 and 20 are treated by air annealing at conditions given in table II. Examples 14, 16, 17, 19 and 21 are treated by annealing under vacuum at 1 Pa and then treated by air annealing at conditions given in table II.

The data for examples 13 to 21, relative light yield and afterglow in $10^{-6}$ at 500 ms, is given in table II below.

TABLE II

| Expl. | Composition of the initial raw material | Graine size of the raw material, μm | Pressing temperature, 0 C. | Pressing pressure, MPa at vacuum of about 0.1-1 Pa | Annealing Conditions | Light yield (rel.) | Afterglow, $10^{-6}$ at 500 ms |
|---|---|---|---|---|---|---|---|
| 13 | $Gd_2O_2S$: 650 ppm Pr: 23 ppm Ce | 6-9 | 1220 | 250 | 1000° C.-4 h. (air) | 0.94 | 14 |
| 14 | $Gd_2O_2S$: 650 ppm Pr: 23 ppm Ce | 6-9 | 1220 | 250 | 1200° C.-2 h- (vacuum), 1000° C.-4 h (air) | 1.0 | 13 |
| 15 | $Gd_2O_2S$: 750 ppm Pr: 20 ppm Ce | 6-9 | 1220 | 200 | 1000° C.-4 h. (air) | 0.85 | 24 |
| 16 | $Gd_2O_2S$: 750 ppm Pr: 20 ppm Ce | 6-9 | 1220 | 200 | 1200° C.-4 h (vacuum), 800° C.-10 h, 1000° C.-4 h (air) | 0.89 | 10 |
| 17 | $Gd_2O_2S$: 750 ppm Pr: 20 ppm Ce | 6-9 | 1220 | 200 | 1270° C.-4 h (vacuum), 800° C.-10 h, 1000° C.-4 h (air) | 0.95 | 16 |
| 18 | $Gd_2O_2S$: 750 ppm Pr: 20 ppm Ce | 6-9 | 1220 | 200 | 1000° C.-4 h. (air) | 0.81 | 15 |
| 19 | $Gd_2O_2S$: 750 ppm Pr: 20 ppm Ce | 6-9 | 1220 | 200 | 1300° C.-3 h (vacuum), 800° C.-10 h, 1000° C.-2 h (air) | 0.91 | 21 |
| 20 | $Gd_2O_2S$: 750 ppm Pr: 20 ppm Ce | 6-9 | 1220 | 200 | 800° C.-10 h, 1000° C.-2 h (air) | 0.74 | 25 |
| 21 | $Gd_2O_2S$: 750 ppm Pr: 20 ppm Ce | 6-9 | 1220 | 200 | 1200° C.-2 h (vacuum), 800° C.-10 h, 1000° C.-2 h (air) | 0.80 | 15 |

In the process of vacuum annealing at 1200° C. to 1300° C. grain growth takes place in ceramics and a decline in its residual porosity occurs, which results in an increase of the ceramics transparency. The total transmission at 513 nm natural emission wavelength raises by about 5% to 15% over that of the sample prior to heat treatment. Compared to the ceramics air heat treatment only, ceramics of the present invention subjected to annealing in vacuum and afterwards in air have a higher light output in luminescence due to their higher transparency. The measurements of total transmission were carried out using a Hitachi 330 spectrometer adapted with integrating sphere of 60 mm diameter.

Annealing in air leads to a significant rise in ceramics light output of about 3-fold and a substantial decline in afterglow of about 10-fold. After vacuum pressing and annealing in vacuum the stoichiometry of the $Gd_2O_2S$ crystalline structure with respect to oxygen and sulfur is disturbed resulting in a rise of the concentration of detrimental electron traps in said ceramic. Considerable improvement in x-ray luminescence characteristics of ceramics after annealing in air is determined by the stochiometry of the crystalline structure of ceramics in order to obtain the optimum performance of the fluorescence ceramics of the present invention. Light output and afterglow was measured with a Hamamatsu PMT of National Instruments ADC, whereby the photomultiplier is shielded against direct irradiation by lead shield. The afterglow was measured with 120 kV/100 mA, 80 cm FDD (18-20 mGy/s), 2 s pulse, whereby all afterglow values are given in ppm of stationary signal. The signal values (light output) were measured on 4×4 $mm^2$ pixels, silicone glued to a photodiode.

The fluorescent ceramic according to the present invention can be used for example in
- a scintillator or fluorescent member for detecting ionizing radiation, preferably x-rays, gamma rays and electron beams; and/or
- an apparatus or device used in the medical field, preferably for a computer tomography (CT).

Most preferred at least one fluorescent ceramic according to the present invention can be used for a detector or apparatus adapted for medical imaging. The detector can be arranged for detecting ionizing radiation.

However, the fluorescent ceramic can be used for any detector known in the medical field. Such detectors are for example X-ray detector, CT-detector, Electronic Portal Imaging detector, and there like.

The invention claimed is:

1. A method for manufacture of a fluorescent ceramic material using a single-axis hot-pressing, said method comprising the steps:
   a) selecting a pigment powder of $Gd_2O_2S$ doped with M, and M represents at least one element selected from the group of Eu, Tb, Yb, Dy, Sm, Ho, Ce or Pr, whereby the grain size of said powder used for hot-pressing is of 1 μm to 20 μm, and said hot-pressing is carried out at
      a temperature of 1000° C. to 1400° C.; and
      a pressure of 100 MPa to 300 MPa;
   b) air annealing at a temperature of 700° C. to 1200° C. for a time period of 0.5 hours to 30 hours.

2. The method according to claim 1, wherein between step a) and step b) an additional step c) is carried out, whereby step c) comprises annealing fluorescent ceramic under vacuum at a temperature of 1000° C. to 1400° C. for a period of time of 0.5 hours to 30 hours.

3. The method according to claim 1, wherein at step a) an undoped $Gd_2O_2S$ powder with a grain size of 1 μm to 20 μm is mixed with a composition comprising at least one element of the group of rare earth ions comprising Eu, Tb, Yb, Dy, Sm, Ho, Ce or Pr.

4. The method of claim 1, where the fluorescent ceramic material converts an ionising radiation into light, whereby said fluorescent ceramic material comprises a single phase in its volume.

5. The method according to claim 1, where the fluorescent ceramic material is made of at least one M doped crystallite and where the grain size is of at least 50% of the M doped crystallite and is in the range of 10 μm to 100 μm.

6. The method according to claim 1, where the fluorescent ceramic material has a texture in at least one crystallographic plane.

7. The method of claim 4, where a dopant of the fluorescent ceramic material is Ce in a weight fraction of 0.1 ppm to 100 ppm; or the dopant is Pr in a weight fraction of 100 ppm to 1000 ppm.

8. The method according to claim 2, wherein at step a) an undoped $Gd_2O_2S$ powder with a grain size of 1 μm to 20 μm is mixed with a composition comprising at least one element of the group of rare earth ions comprising Eu, Tb, Yb, Dy, Sm, Ho, Ce or Pr.

* * * * *